US012652586B2

(12) United States Patent
Balan et al.

(10) Patent No.: US 12,652,586 B2
(45) Date of Patent: Jun. 9, 2026

(54) DUAL ACTIVE PROTOCOL STACK HANDOVER WITH COORDINATED PATTERN

(71) Applicant: NOKIA TECHNOLOGIES OY, Espoo (FI)

(72) Inventors: Irina-Mihaela Balan, Munich (DE); Ingo Viering, Munich (DE); Ahmad Awada, Munich (DE); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 512 days.

(21) Appl. No.: 18/246,031

(22) PCT Filed: Sep. 20, 2021

(86) PCT No.: PCT/EP2021/075777
§ 371 (c)(1),
(2) Date: Mar. 20, 2023

(87) PCT Pub. No.: WO2022/063719
PCT Pub. Date: Mar. 31, 2022

(65) Prior Publication Data
US 2023/0362753 A1    Nov. 9, 2023

Related U.S. Application Data

(60) Provisional application No. 63/083,273, filed on Sep. 25, 2020.

(51) Int. Cl.
*H04W 36/00* (2009.01)
*H04B 7/26* (2006.01)
(Continued)

(52) U.S. Cl.
CPC ...... *H04W 36/0058* (2018.08); *H04B 7/2643* (2013.01); *H04W 36/00692* (2023.05);
(Continued)

(58) Field of Classification Search
CPC ....... H04W 36/0058; H04W 36/00692; H04W 36/0011; H04W 36/08; H04W 36/185; H04W 36/249; H04W 8/24
See application file for complete search history.

(56) References Cited

U.S. PATENT DOCUMENTS 8,842,602 B2    9/2014  Koo et al.
9,374,213 B2 *  6/2016  Ahn ................... H04W 72/541
(Continued)

FOREIGN PATENT DOCUMENTS

WO    2020/018282 A1    1/2020
WO    2020069174 A1    4/2020

OTHER PUBLICATIONS

"3rd Generation Partnership Project; Technical Specification Group Radio Access Network; NG-RAN; Xn application protocol (XnAP) (Release 16)", 3GPP TS 38.423 V16.1.0, Mar. 2020, pp. 1-334.
(Continued)

*Primary Examiner* — Hashim S Bhatti
(74) *Attorney, Agent, or Firm* — Lippes Mathias LLP

(57) ABSTRACT

A method, apparatus, and a computer-readable storage medium are provided for a coordinated receive (or transmit) pattern during a DAPS handover. In an example implementation, the method may include a UE sending a measurement report to a first network node, the measurement report including at least a request for a time division multiplexing pattern. The method may further include receiving a radio resource control configuration from the first network node, the radio resource control configuration including at least the time division multiplexing pattern.

13 Claims, 8 Drawing Sheets

(51) Int. Cl.
| | |
|---|---|
| *H04W 36/08* | (2009.01) |
| *H04W 36/18* | (2009.01) |
| *H04W 36/24* | (2009.01) |
| *H04W 36/36* | (2009.01) |

(52) U.S. Cl.
CPC ........ *H04W 36/0011* (2013.01); *H04W 36/08*
(2013.01); *H04W 36/185* (2023.05); *H04W*
*36/249* (2023.05); *H04W 36/362* (2023.05)

(56) References Cited

U.S. PATENT DOCUMENTS

| | | | | |
|---|---|---|---|---|
| 9,936,425 | B2 | 4/2018 | Du et al. | |
| 2014/0295871 | A1* | 10/2014 | Ahn | H04W 24/10 |
| | | | | 455/452.1 |
| 2018/0295551 | A1 | 10/2018 | Ahn et al. | |
| 2019/0253945 | A1 | 8/2019 | Paladugu et al. | |
| 2020/0029260 | A1* | 1/2020 | Kadiri | H04W 36/026 |
| 2020/0112901 | A1 | 4/2020 | Ahn et al. | |
| 2020/0145888 | A1* | 5/2020 | Paladugu | H04W 80/02 |
| 2020/0275326 | A1 | 8/2020 | Ma et al. | |
| 2022/0046500 | A1* | 2/2022 | Yiu | H04W 8/24 |
| 2023/0345332 | A1* | 10/2023 | Wang | H04W 36/144 |
| 2024/0298222 | A1* | 9/2024 | Yiu | H04W 36/0061 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423 V16.1.0, Mar. 2020, pp. 1-438.

"3rd Generation Partnership Project; Technical Specification Group Radio Access Network; NR; NR and NG-RAN Overall Description; Stage 2 (Release 16)", 3GPP TS 38.300 V16.1.0, Mar. 2020, pp. 1-133.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.1.0, Mar. 2020, pp. 1-386.

"3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, pp. 1-1048.

"Introduction of NR mobility enhancement", 3GPP TSG-RAN WG2 Meeting #109 electronic, R2-2001749, Feb. 24-Mar. 6, 2020, pp. 1-524.

"Simultaneous connectivity handover with single uplink operation", 3GPP TSG-RAN WG2 Meeting #106, R2-1907273, Agenda: 12.3.2.1, Nokia, May 13-17, 2019, 5 pages.

"Physical layer aspects for NR mobility enhancements", 3GPP TSG RAN WG1 Meeting #97, R1-1906056, Agenda: 7.2.12.1, Huawei, May 13-17, 2019, 12 pages.

Hu et al., "Interference Avoidance for In-Device Coexistence in 3GPP LTE-Advanced: Challenges and Solutions", IEEE Communications Magazine, vol. 50, No. 11, Nov. 2012, pp. 60-67.

Office action received for corresponding European Patent Application No. 21782477.0, dated Mar. 4, 2025, 4 pages.

International Search Report and Written Opinion for International Application No. PCT/EP2021/075777, mailed on Dec. 22, 2021, 18 pages.

3GPP TSG-RAN WG2 Meeting #107bis, R2-1912838 (Revision of R2-1909848); "UL TDM aspects of enhanced MBB HO using Dual Active Protocol Stack"; Agenda: 7.3.2.1.2; Source: Qualcomm Incorporated, Intel Corporation, MediaTek Inc., Google Inc., Apple Inc., Charter Communications; Chongqing, China; Oct. 14-18, 2019; 9 pages.

3GPP TSG RAN WG1 #99, R1-1912674; "TDM and Capabilities for LTE DAPS"; Agenda Item: 5; Source: Qualcomm Incorporated; Reno, NV, USA; Nov. 18-22, 2019; 5 pages.

* cited by examiner

Example Wireless Network 130

500

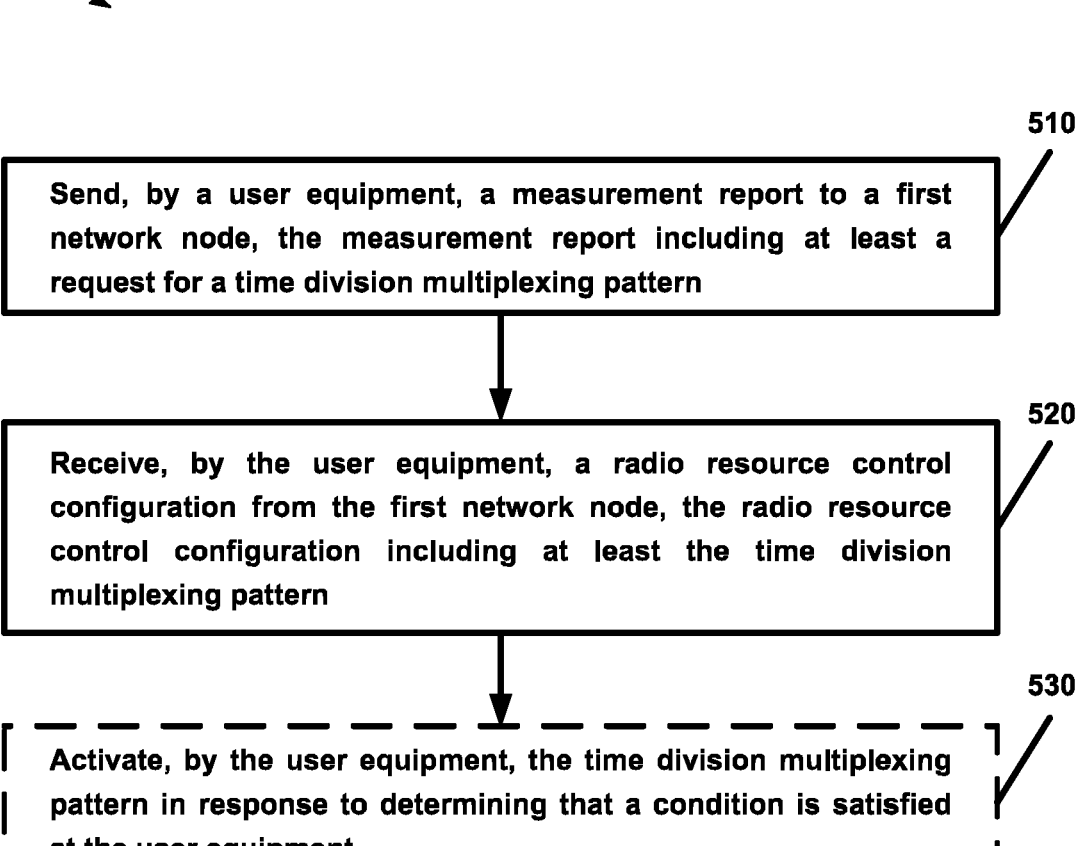

510

Send, by a user equipment, a measurement report to a first network node, the measurement report including at least a request for a time division multiplexing pattern

520

Receive, by the user equipment, a radio resource control configuration from the first network node, the radio resource control configuration including at least the time division multiplexing pattern

530

Activate, by the user equipment, the time division multiplexing pattern in response to determining that a condition is satisfied at the user equipment

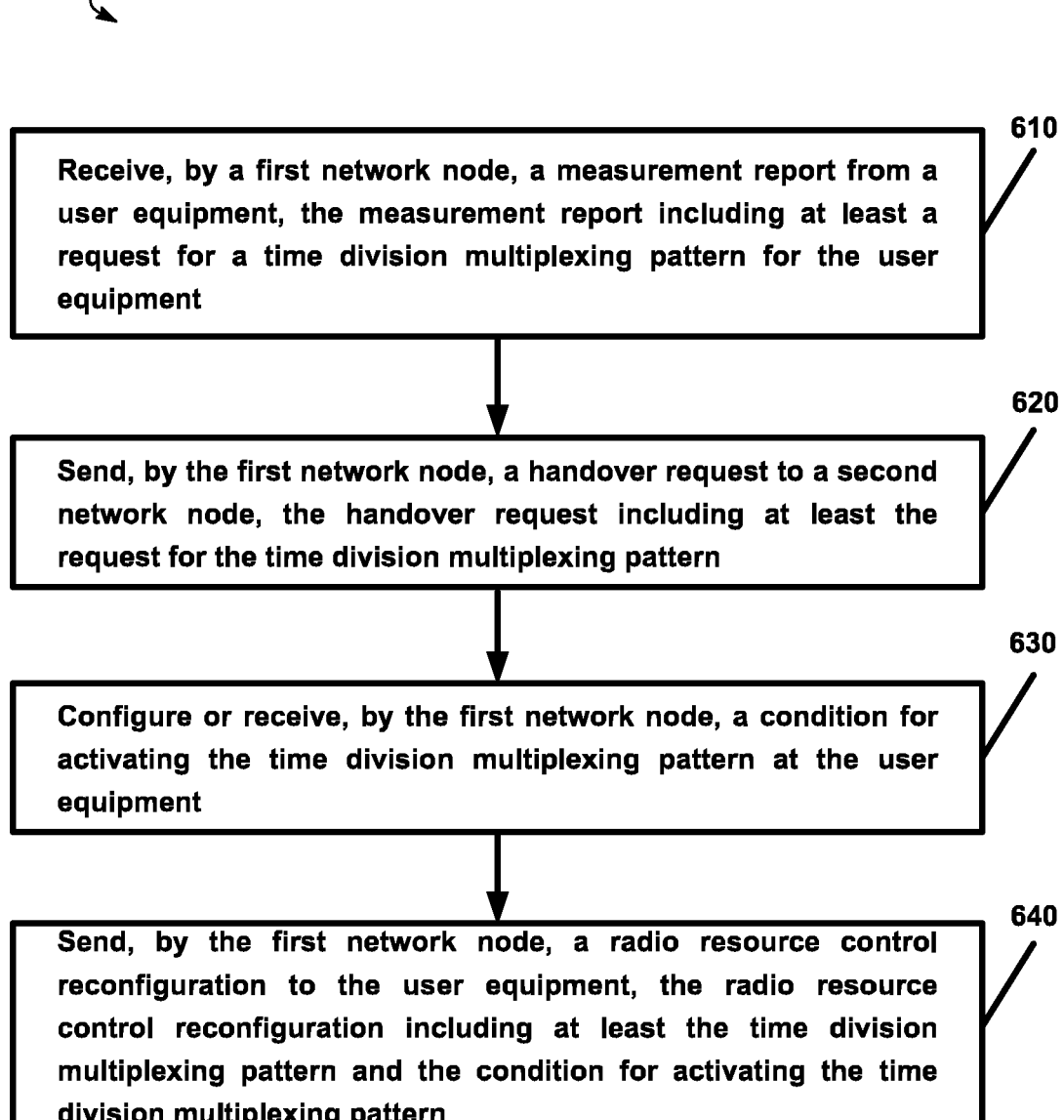

610

Receive, by a first network node, a measurement report from a user equipment, the measurement report including at least a request for a time division multiplexing pattern for the user equipment

620

Send, by the first network node, a handover request to a second network node, the handover request including at least the request for the time division multiplexing pattern

630

Configure or receive, by the first network node, a condition for activating the time division multiplexing pattern at the user equipment

640

Send, by the first network node, a radio resource control reconfiguration to the user equipment, the radio resource control reconfiguration including at least the time division multiplexing pattern and the condition for activating the time division multiplexing pattern

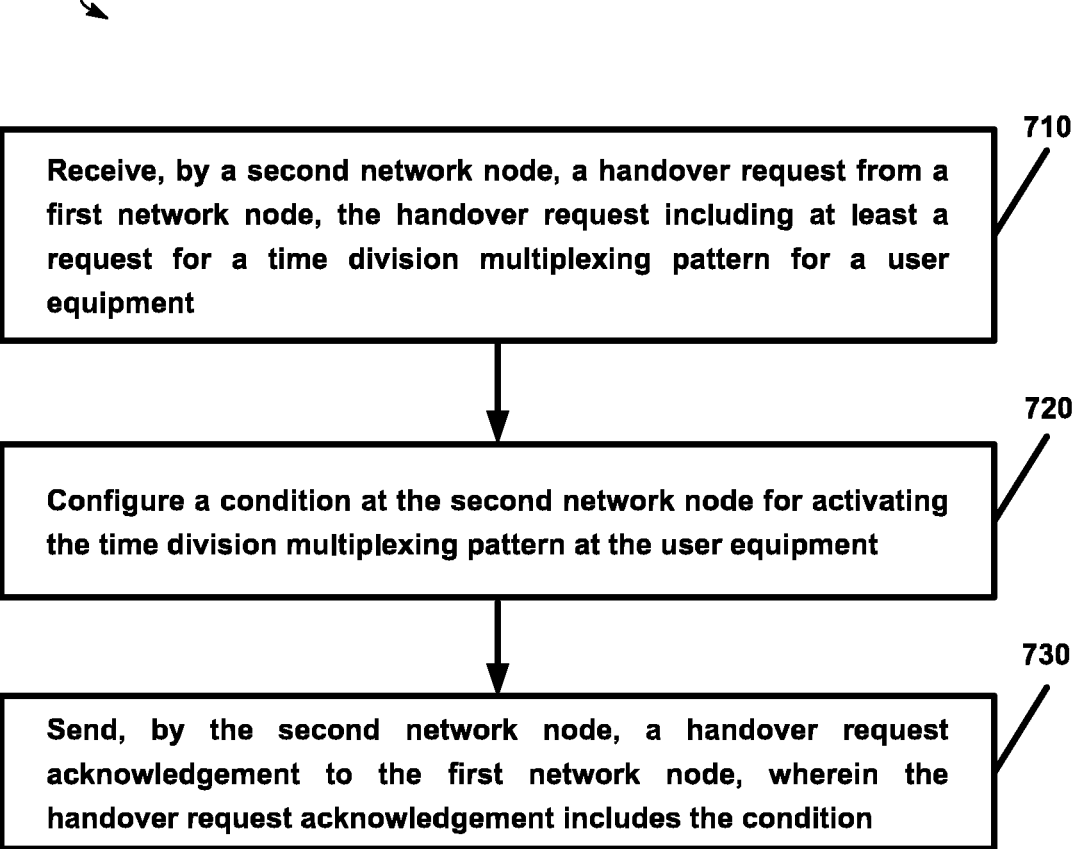

710

Receive, by a second network node, a handover request from a first network node, the handover request including at least a request for a time division multiplexing pattern for a user equipment

720

Configure a condition at the second network node for activating the time division multiplexing pattern at the user equipment

730

Send, by the second network node, a handover request acknowledgement to the first network node, wherein the handover request acknowledgement includes the condition

FIG. 7

DUAL ACTIVE PROTOCOL STACK HANDOVER WITH COORDINATED PATTERN

CROSS-REFERENCE TO RELATED APPLICATIONS

This application is a national stage entry of International Application No. PCT/EP2021/075777, filed Sep. 20, 2021, entitled "DUAL ACTIVE PROTOCOL STACK HAN-DOVER WITH COORDINATED PATTERN" which claims the benefit of priority of U.S. Provisional Application No. 63/083,273, filed Sep. 25, 2020, both of which are hereby incorporated by reference in their entireties.

TECHNICAL FIELD

This description relates to wireless communications, and in particular, dual active protocol stack (DAPS) handover.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra reliable low latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for a coordinated receive (or transmit) pattern during a DAPS handover. In an example implementation, the method may include a UE sending a measurement report to a first network node, the measurement report including at least a request for a time division multiplexing pattern. The method may further include receiving a radio resource control configuration from the first network node, the radio resource control configuration including at least the time division multiplexing pattern.

In an additional example implementation, the method may include a first network node (e.g., source gNB) receiving a measurement report from a user equipment, the measurement report including at least a request for a time division multiplexing pattern for the user equipment and sending a handover request to a second network node, the handover request including at least the request for the time division multiplexing pattern. The method may further include configuring or receiving a condition for activating the time division multiplexing pattern at the user equipment and sending a radio resource control reconfiguration to the user equipment, the radio resource control reconfiguration including at least the time division multiplexing pattern and the condition for activating the time division multiplexing pattern.

In another additional example implementation, the method may include a second network node (e.g., target gNB) receiving a handover request from a first network node, the handover request including at least a request for a time division multiplexing pattern for a user equipment and configuring a condition at the second network node for activating the time division multiplexing pattern at the user equipment. The method may further include a handover request acknowledgement to the first network node, wherein the handover request acknowledgement includes the condition.

BRIEF DESCRIPTION OF THE DRAWINGS

FIG. 5 is a flow chart illustrating a coordinated pattern (e.g., receive pattern) at a UE during a DAPS handover, according to an example implementation.

FIGS. 6-7 are flow charts illustrating coordinated patterns (e.g., transmit pattern) at a network node during a DAPS handover, according to an example implementation.

DETAILED DESCRIPTION

Figure 1:
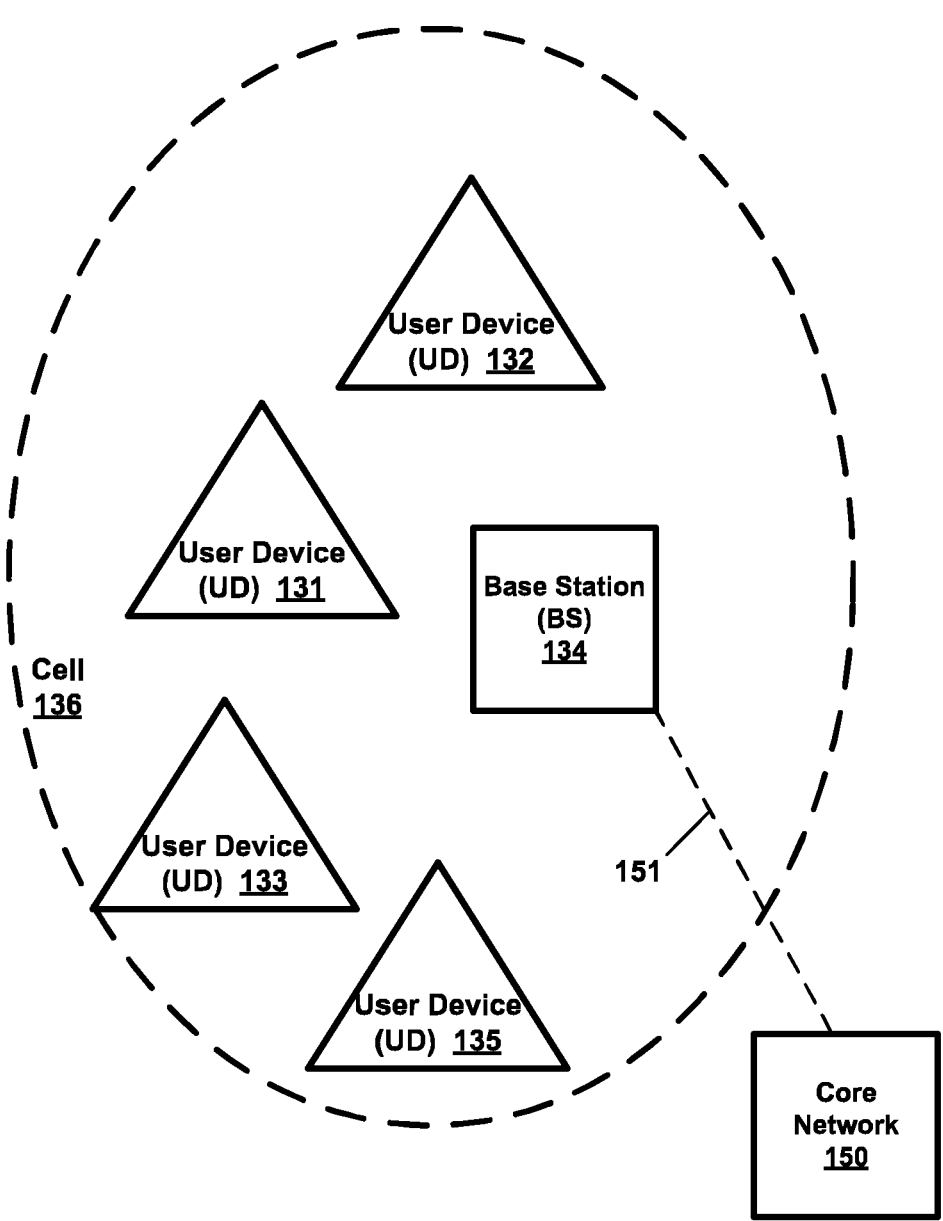
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In mobile communication networks, a handover (HO) is used to ensure service continuity for mobile UEs. In NR, a handover mechanism similar to LTE is used for handovers. For example, a source cell strength/quality is compared to neighboring cell measurements. When a neighbor cell's strength/quality is better by a certain amount (e.g., hysteresis) than the strength/quality of the source cell for a given amount of time (e.g., time to trigger, TTT), the UE sends a measurement report to the source cell prompting the source cell to prepare a handover to the indicated neighbor cell, a target cell. The UE is then instructed via a handover command to connect to the target cell. When the UE receives the handover command and is attempting a random access procedure (e.g., RACH procedure) on the target cell, the UE disconnects from the source cell which may cause an interruption in service. So, the source cell may start forwarding data to the target cell. The service interruption ends once the UE has successfully connected to the target cell and the target cell transmitting the data received from the source cell to the UE.

The mechanism described above has several drawbacks, e.g., interruption in service and lack of robustness. For instance, if the handover is performed too early, the UE may not be able to connect to the target cell and/or may experience a radio link failure (RLF) soon after the handover as the channel conditions may not be stable enough. If the handover is performed too late, the UE may lose connectivity with the source cell before completing the handover. These drawbacks may be considered as significant in NR due to service requirements and 3GPP standardization has devised new mechanisms to try to minimize them.

For example, a dual active protocol stack (DAPS) handover feature was introduced in Rel-16 in order to bring down the service interruption time, for example, in downlink, to ~0 ms. This may be achieved by having two packet data convergence protocol (PDCP) stacks in the UE so that, upon receiving the handover command, the UE can keep the communication with the source cell while performing a random access procedure to the target cell. The connection to the source cell may be released only after the target cell sends a handover success message to the source cell.

The DAPS handover is expected to reduce interruption time during handovers. The UE is supposed to maintain the connection to the source cell (both transmit (Tx) and receive (Rx)) while performing a random access procedure to the target cell. This may be especially an issue in the downlink direction. Moreover, when operating at higher frequencies (e.g., frequency range 2, FR2), even though the UE may be equipped with multiple antenna panels, but may still not be able to listen to two cells at the same time (e.g., simultaneously).

Therefore, coordination between cells (e.g., source and target cells) and UE is needed in order to allow simultaneous communication with the both cells in an efficient manner. In particular, there is a desire and/need during the time window when the UE is initiating a random access procedure to a target cell.

The present disclosure describes a mechanism for DAPS handover, for example, at higher frequencies, where a UE is configured with multiple panels. The mechanism includes a source cell providing the UE with time division multiplexing (TDM) patterns, for example, a first TDM pattern and a second TDM pattern, where the UE listens to the source cell using the first TDM pattern (e.g., may be using a first panel) and listens to the target cell using the second TDM pattern (e.g., may be using a second panel) based on one or more conditions being satisfied. In an example implementation, the one or more conditions may be configured by the source cell, target cell, or coordinated between the source and target cells. In an additional example implementation, the one or more conditions may be linked to whether the TDM patterns are needed or not, for example, depending on whether the source and target cells are received on the same panel or not. In another additional example implementation, the TDM patterns may be linked to certain search spaces and/or control resource sets (CORESETs), which may be similar to multi-transmission reception point (TRP) operation, to allow the network to utilize/reserve only certain resources for the UEs using the dual TDM patterns and to optimize the UE reception capabilities. In some implementations, the proposed procedures may be used in the downlink direction, or uplink direction, or both directions.

The present disclosure provides a method, apparatus, and a computer-readable storage medium for a coordinated receive (or transmit) pattern during a DAPS handover. In an example implementation, the method may include a UE sending a measurement report to a first network node, the measurement report including at least a request for a time division multiplexing pattern. The method may further include receiving a radio resource control configuration from the first network node, the radio resource control configuration including at least the time division multiplexing pattern.

In an additional example implementation, the method may include a first network node (e.g., source gNB) receiving a measurement report from a user equipment, the measurement report including at least a request for a time division multiplexing pattern for the user equipment and sending a handover request to a second network node, the handover request including at least the request for the time division multiplexing pattern. The method may further include configuring or receiving a condition for activating the time division multiplexing pattern at the user equipment and sending a radio resource control reconfiguration to the user equipment, the radio resource control reconfiguration including at least the time division multiplexing pattern and the condition for activating the time division multiplexing pattern.

In another additional example implementation, the method may include a second network node (e.g., target gNB) receiving a handover request from a first network node, the handover request including at least a request for a time division multiplexing pattern for a user equipment and configuring a condition at the second network node for activating the time division multiplexing pattern at the user equipment. The method may further include a handover request acknowledgement to the first network node, wherein the handover request acknowledgement includes the condition.

Figure 2:
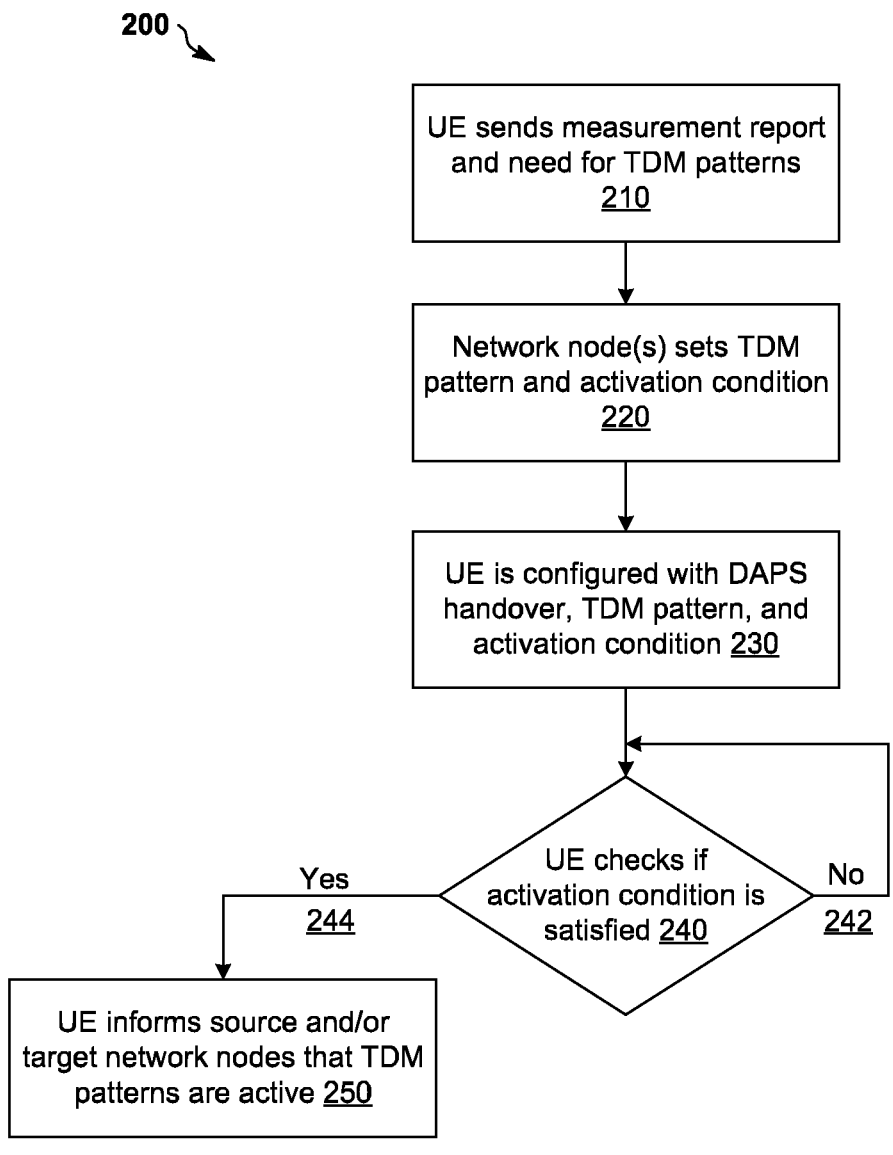
FIGS. 2-4 illustrate flowcharts of coordinated receive pattern during a DAPS handover, according to example implementations.

FIG. 2 illustrates a flowchart 200 of a coordinated receive pattern during a DAPS handover, according to an example implementation.

In an example implementation, at 210, a UE, which may be same as or similar to UD 133 of FIG. 1, may send a measurement report to a network node, e.g., source node, which may be same as or similar to BS 134 of FIG. 1, to initiate (or trigger) a handover from a source node to a target node. In some implementations, for example, the UE may send the measurement report to the source node and may include a request for a TDM pattern at the UE (or may indicate a need for a TDM pattern at the UE). As described earlier, in some scenarios, the UE may not be able to simultaneously receive from source and target nodes, and may need a TDM pattern to simultaneously receive from the source and target nodes.

In some implementations, for example, the request for a TDM pattern at the UE may be indicated in the measurement report via one or more of a binary flag (e.g., yes/no), a flag indicating the usefulness of a TDM pattern (e.g., yes, no, maybe), and a percentage (e.g., 20%, 80%, etc.) indicating the probability of needing a time division multiplexing pattern. In an example implementation, the values (of the indication) may be determined locally by the UE based at least on the availability of multi-panels at the UE and/or whether both nodes (source and target nodes) are received on a same panel or different panels.

At 220, a network node may configure (or define) a TDM pattern and at least a condition for activating the TDM pattern at the UE. In some implementations, for example, a source node or a target node may configure a TDM pattern and one or more conditions for activating the TDM pattern at the UE. The TDM pattern may define at least a time instant when the UE may receive (or transmit) data from the source node or a target node and/or using a certain antenna panel of the UE. In an example implementation, the time instant may include, for example, a slot, a symbol, a plurality of symbols, etc.

In addition, in some implementations, for example, the source node or target node may also configure (or define) the conditions for activating the TDM pattern at the UE. The conditions may indicate to the UE when the TDM pattern may be activated at the UE. In other words, the UE may activate the TDM pattern at the UE when a condition configured by the source node or target node is satisfied. In an additional example implementation, the source node and target node may coordinate with each other to configure the TDM pattern and/or the condition(s). In some implementations, for example, the configuration by the source node or target node may be given priority over the other.

At 230, the UE may configure the TDM pattern and activation condition. In some implementations, for example, the UE may receive the TDM pattern and activation condition from the source node. It should be noted that the UE receives the TDM pattern and activation condition from the source node irrespective of whether the source node or the target node configured the TDM pattern and activation condition as the UE does not have a connection to the target node at this time.

At 240, the UE may determine if the condition (e.g., activation condition) is satisfied.

At 242, in response to determining that the activation condition is not satisfied, the UE continues to check to determine whether the activation condition is satisfied.

At 244, in response to determining that the activation condition is satisfied, the UE, at 250, may inform the network node (e.g., source and/or target nodes) that the TDM pattern will be activated at the UE. The notification to the source and/or target nodes ensures the UE is in sync with source and/or target nodes.

Figure 3:
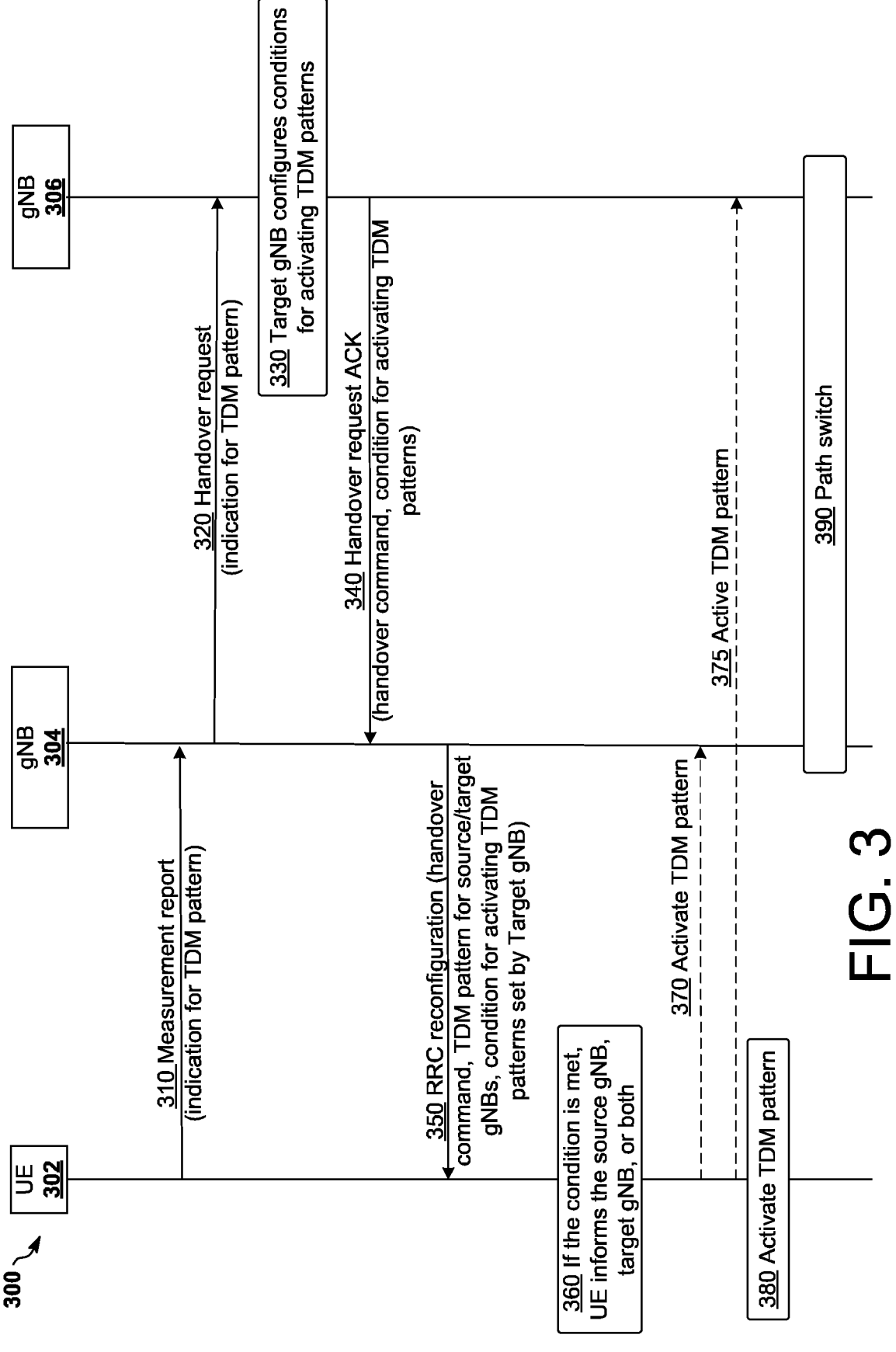

FIG. 3 illustrates a flowchart 300 of a coordinated receive pattern during a DAPS handover, according to an example implementation. Although disclosure described a receive pattern, the mechanisms described herein may be used for transmit pattern on the uplink as well.

In some implementations, for example, FIG. 3 includes a UE, e.g., UE 302, a source node, e.g., gNB 304, and/or a target node, e.g., gNB 306. In an example implementation, UE 302 may be same as or similar to UD 133 of FIG. 1 and source node 304 and/or target node 306 may be same as or similar to BS 134 of FIG. 1.

In an example implementation, at 310, a UE, e.g., UE 302 may send a measurement report to gNB 304. In some implementations, for example, the UE may send the measurement report to gNB 304 and may include a request for a TDM pattern at the UE. UE 302, in some scenarios, may not be able to simultaneously receive from source and target nodes, and may need a TDM pattern to simultaneously receive from source and target nodes.

At 320, the source node, e.g., gNB 304 may send a handover request to a target node, e.g., gNB 306. In some implementations, for example, the handover request may include the request for a TDM pattern (or an indication that the UE needs a TDM pattern). In an example implementation, gNB 304 may forward the request/indication received in the measurement report to the target node, gNB 306. In an additional example implementation, gNB 304 may include a binary indicator composed by gNB 304 to send to gNB 306.

At 330, upon receiving the handover request from gNB 304, gNB 306 may configure conditions for activating TDM patterns at the UE. As described earlier, the conditions for activating TDM patterns may include the occurrence of a pre-configured time instance as defined in an absolute frame number, relative to the time instant of receiving the handover command, or relative to sending physical random access channel (PRACH) preamble. In some implementations, for example, the condition may be based on whether the time division multiplexing pattern is needed. In some implementations, for example, the TDM pattern may be linked to one or more search spaces and/or control resource sets.

At 340, gNB 306 may send a handover request acknowledgement message to gNB 304. In some implementations, for example, the handover request acknowledgement message may include a handover command and the condition for activating the TDM pattern.

In some implementations, for example, gNB 306 may send the handover request ACK message that includes the handover command, TDM pattern configured by gNB 306, and/or configured condition outside a handover command container. Although the TDM pattern is being sent to the UE, it should be noted that the UE does not have to activate the TDM pattern prior to the condition being met (or the TDM pattern is activated once the condition is met or satisfied).

At 350, gNB 304 may send an RRC reconfiguration message to UE 302. In some implementations, for example, the RRC reconfiguration message may include the handover command, TDM patterns for gNB 304 and gNB 306, and the condition for activating the TDM pattern as configured by gNB 306.

At 360, UE 302 may determine whether the activation condition is satisfied to activate the TDM pattern. In an example implementation, for example, the activation condition may be an absolute frame number that occurs after the UE completes the processing of the handover command, or the occurrence of the first PRACH occasion (or shortly after).

In an additional example implementation, the activation condition may be an event. For example, the UE may transmit the contention-free RACH preamble to gNB 306 and upon receiving the CFRA preamble, gNB 306 may apply the TDM pattern for allowing the UE to receive the random access response (RAR). In another additional example implementation, UE 302 is no longer receiving from gNB 304 and target gNB 306 on the same antenna panel. It should be noted that the activation condition may be associated with the activation of the gNB 304 TDM as the TDM of gNB 306 may be assumed to be active by the UE upon the reception of the handover command by the UE.

At 370, in response to determining that the activation condition is met, UE 302 may inform gNB 304 to activate the TDM pattern at gNB 304. In some implementations, for example, UE 302 may inform gNB 304 via, for example, a media access control (MAC) control element (CE) as the radio link between UE 302 and gNB continues even after the transmission of the handover command.

At 375, in response to determining that the activation condition is met, UE 302 may information gNB 306 to activate TDM pattern at gNB 306. In some implementations, for example, UE 302 may inform gNB 306 by, for example, piggybacking the information on message 1 (Msg 1) of a four-step RACH procedure or Message A (Msg A) of a two-step RACH procedure if the condition is met prior to sending RRC reconfiguration complete message (not shown). Alternately, if the condition (gNBs 304 and 306 cannot be received on same panel) is met after sending the RRC reconfiguration complete message, UE 302 may inform gNB 306 via, for example, MAC CE. In addition, in some implementations, for example, UE 302 may inform just one node, as described above, and this node may forward the information to the other node, for example, via an Xn interface between the nodes.

At 380, UE 302 activates the TDM pattern for receiving (or transmitting) data from gNB 304 and gNB 306, simultaneously.

At 390, the user plane (UP) is switched from the core network to gNB 306 (instead of from the core network to gNB 304).

Thus, a coordinated receive (or transmit) pattern during a DAPS handover may be achieved. Some of the benefits of the implementations described herein may be summarized as below.

For example, the TDM pattern of the gNB 304 does not need to be activated before the UE sends PRACH preamble to the target cell. This means that the UE can continue the radio communication with gNB 304 after receiving the RRC reconfiguration containing the handover command without using TDM pattern until the transmission of the PRACH preamble. Once/before the UE sends the PRACH preamble, the UE informs gNB 304 to activate its TDM pattern. From this time instant, the UE starts to apply TDM pattern for both gNBs 304 and 306, as gNB 306 considers its TDM pattern to be active immediately upon configuration.

In an additional example implementation, if the UE can receive both source and target cells on the same panel, there is no need to activate the TDM patterns. However, the UE may be proactively provided with the TDM patterns which are not activated by source/target cells or until UE cannot receive signals from source and target cells on same panel at the UE. If this happens, the UE may now receive source and target gNBs on different panels, and the UE may inform the source gNB which in turn informs the target gNB of handover or the UE may inform both source and target gNBs. After this time instant, the UE and the network may apply the pre-configured TDM patterns for radio communications.

Figure 4:
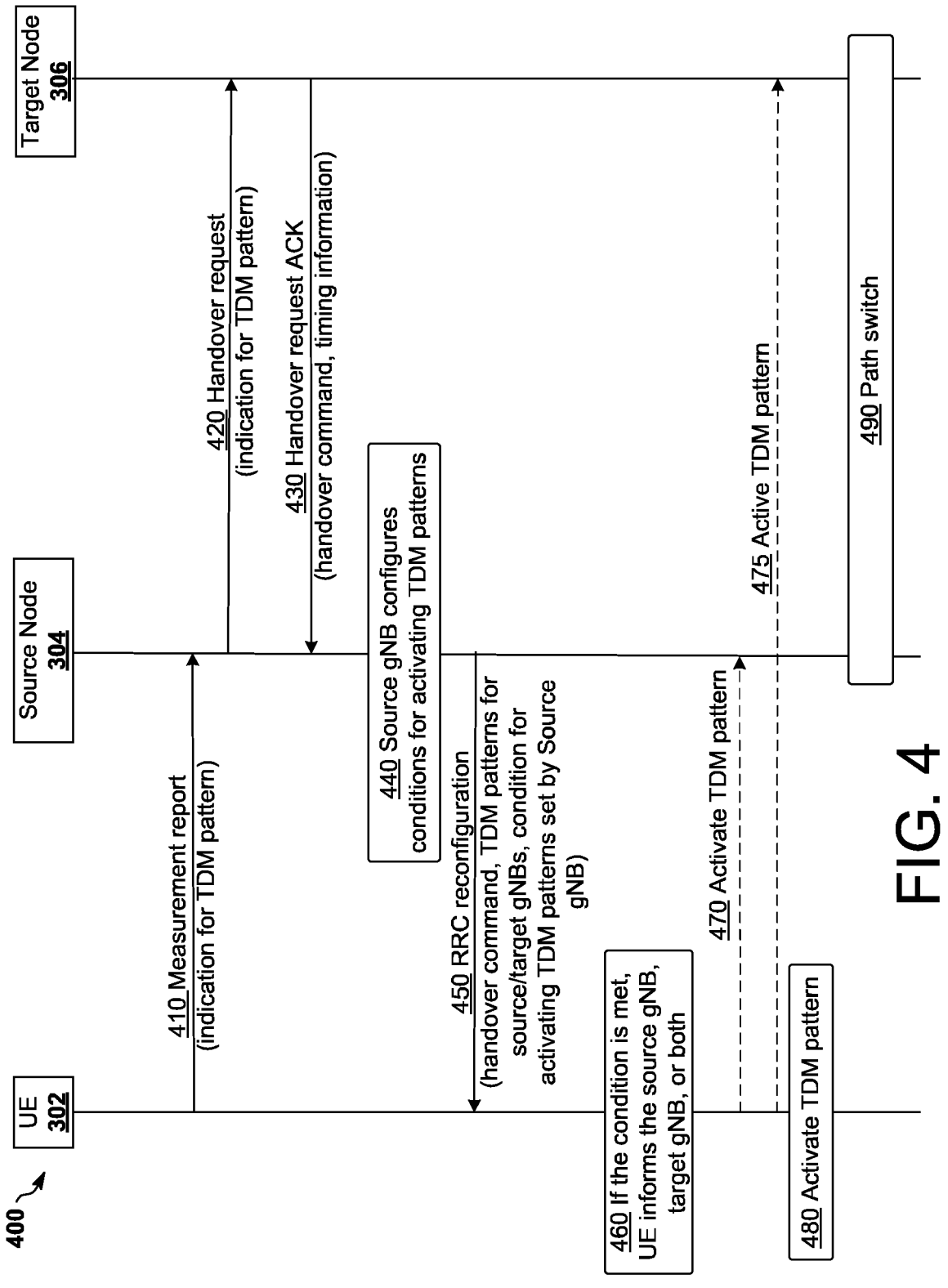

FIG. 4 illustrates a flowchart 400 of a coordinated receive pattern during a DAPS handover, according to an additional example implementation. In some implementations, for example, FIG. 4 includes a UE, e.g., UE 302, a source node, e.g., gNB 304, and/or a target node, e.g., gNB 306. In an example implementation, UE 302 may be same as or similar to UD 133 of FIG. 1 and source node 304 and/or target node 306 may be same as or similar to BS 134 of FIG. 1.

The operations at 410 and 420 may be similar to operations at 310 and 320 of FIG. 3, respectively.

At 430, gNB 306 may send a handover request acknowledgement to gNB 304. In some implementations, for example, the handover request acknowledgement may include a handover command, timing information between cells, RACH occasion locations outside the handover command container, etc.

At 440, gNB 304 may configure conditions for activating TDM patterns at the UE. As described earlier, the conditions for activating TDM patterns may include one or more of the following conditions. It should be noted that the conditions configured by gNB 304 may be similar to the conditions configured by gNB 306 at 330 of FIG. 3. In addition, in some implementations, for example, the condition may be based on whether the TDM pattern is needed. In some implementations, for example, the TDM pattern may be linked to one or more search spaces and/or control resource sets.

The operations at 450 may be similar to operations at 350 of FIG. 3. However, it should be noted that the condition for activating the TDM is configured by gNB 304 at 440 (vs 330 of FIG. 3).

In an example implementation, the operations at 460, 470, 475, 480, and 490 may be similar to operations 360, 370, 375, 380, and 390 of FIG. 3.

The advantages of using the proposed mechanism is that it provides much more flexibility to the network in terms of if and when to use the TDM pattern and allows to apply them when needed which maximizes the efficiency of the UE radio communication with both cells. This would be useful for several services, e.g., extended reality (XR), augmented reality (AR), etc. where high throughput needs to be guaranteed during the handover.

FIG. 5 is a flow chart 500 illustrating a coordinated receive pattern during a DAPS handover, according to an example implementation.

In an example implementation, at block 510, a user equipment, e.g., UE 302, may send a measurement report to a first network node, e.g., gNB 304. In some implementations, for example, the measurement report may include at least a request for a TDM pattern.

At block 520, the UE may receive an RRC configuration message from the first network node, e.g., gNB 304. In some implementations, for example, the RRC configuration message may include at least the TDM pattern.

Optionally, at block 530, the UE may activate the TDM pattern in response to determining that the condition is satisfied at the UE.

In some implementations, for example, the RRC configuration may include at least a condition for activating the TDM pattern at the UE.

Thus, the UE may perform a coordinated receive (or transmit) pattern during a DAPS handover to improve performance.

FIG. 6 is a flow chart 600 illustrating a coordinated pattern (e.g., transmit/receive pattern) during a DAPS handover, according to an example implementation.

In an example implementation, at block 610, a first network node, e.g., gNB 304, may receive a measurement report from a user equipment, e.g., UE 302. In some implementations, for example, the measurement report may include at least a request for a TDM pattern for the UE.

At block 620, gNB 304 may send a handover request to a second network node, e.g., gNB 306. In some implementations, for example, the handover request may include at least the request for the TDM pattern.

At block 630, gNB 304 may configure or receive a condition for activating the TDM pattern at the user equipment. In an example implementation, gNB 304 may configure the condition for activating the TDM pattern at the UE. In an additional example implementation, gNB 304 may receive the condition for activating the TDM pattern from gNB 306.

At block 640, gNB 304 may send an RRC reconfiguration message to UE 302. In some implementations, for example, the RRC reconfiguration message may include at least the TDM pattern and the condition for activating the TDM pattern.

Thus, the source gNB may perform a coordinated transmission to a UE (or a reception from the UE) during a DAPS handover to improve performance.

FIG. 7 is a flow chart 700 illustrating a coordinated pattern (e.g., transmit/receive pattern) during a DAPS handover, according to an example implementation.

In an example implementation, at block 710, a second network node, e.g., gNB 306, may receive a handover request from a first network node, e.g., gNB 304. In some implementations, for example, the handover request may include at least a request for a TDM pattern for a UE, e.g., UE 302.

At block 720, gNB 306 may configure a condition at the second network node, e.g., gNB 306, for activating the TDM pattern at UE 302.

At block 730, gNB 306 may send a handover request acknowledgement to the first network node, e.g., gNB 304. In some implementations, for example, the handover request acknowledgement may include the condition for activating the TDM pattern at UE 302.

Thus, the source gNB may perform a coordinated transmission to a UE (or a reception from the UE) during a DAPS handover to improve performance.

The advantages of using the proposed methods are that they provide much more flexibility to the network (e.g., if and/or when to use the TDM patterns) and may be applied when needed to maximize the efficiency of the UE radio communications with both cells. This would be useful for several services, e.g., extended reality (XR) or augmented reality (AR) services where high throughput needs to be guaranteed during the handover execution.

Additional example implementations are described herein.

Example 1. A method for a handover in a communication network, comprising: sending, by a user equipment, a measurement report to a first network node, the measurement report including at least a request for a time division multiplexing pattern; and receiving, by the user equipment, a radio resource control configuration from the first network node, the radio resource control configuration including at least the time division multiplexing pattern.

Example 2. The method of Example 1, wherein the radio resource control configuration further includes at least a condition for activating the time division multiplexing pattern at the user equipment.

Example 3. The method of any of Examples 1-2, further comprising:

activating, by the user equipment, the time division multiplexing pattern in response to determining that the condition is satisfied at the user equipment.

Example 4. The method of any of Examples 1-3, further comprising: sending a message to the first network node and/or a second network node prior to the activating of the time division multiplexing pattern at the first network node and/or the second network node, the message informing the first network node and/or the second network node to activate the time division multiplexing at the first network node and/or the second network node, respectively.

Example 5. The method of any of Examples 1-4, wherein the message is sent to the first network node via a medium access control (MAC) control element (CE).

Example 6. The method of any of Examples 1-5, wherein the message is sent to the second network node via a message 1 of a four-step random access procedure or a message A of a two-step random access procedure in response to the condition being satisfied prior to sending of a radio resource control configuration complete message.

Example 7. The method of any of Examples 1-5, wherein the message is sent to the second network node via a medium access control (MAC) control element (CE) in response to the condition being satisfied after sending of a radio resource control configuration complete message.

Example 8. The method of any of Examples 1-7, wherein the message is sent to the first network node, and the message is forwarded from the first network node to the second network node via an Xn interface between the first network node and the second network node.

Example 9. The method of any of Examples 1-7, wherein the message is sent to the second network node, and the message is forwarded from the second network node to the first network node via an Xn interface between the second network node and the first network node.

Example 10. The method of any of Examples 1-9, wherein the request includes: a binary flag, a flag indicating whether a time division multiplexing pattern can be used at the user equipment, or a probability of requiring a time division multiplexing pattern at the user equipment.

Example 11. The method of any of Examples 1-10, wherein the condition includes an occurrence of a pre-configured time instance as defined in: an absolute frame number, relative to the time instant of receiving the handover command, relative to sending a random access preamble, or any combination thereof.

Example 12. The method of any of Examples 1-11, wherein the condition is based on whether the time division multiplexing pattern is needed.

Example 13. The method of any of Examples 1-12, wherein the time division multiplexing pattern is linked to one or more search spaces and/or control resource sets.

Example 14. A method for a handover in a communication network, comprising: receiving, by a first network node, a measurement report from a user equipment, the measurement report including at least a request for a time division multiplexing pattern for the user equipment; sending, by the first network node, a handover request to a second network node, the handover request including at least the request for the time division multiplexing pattern; configuring or receiving, by the first network node, a condition for activating the time division multiplexing pattern at the user equipment; and sending, by the first network node, a radio resource control reconfiguration to the user equipment, the radio resource control reconfiguration including at least the time division multiplexing pattern and the condition for activating the time division multiplexing pattern.

Example 15. The method of Example 14, wherein the condition for activating the time division multiplexing pattern is received via a handover request acknowledgement from the second network node.

Example 16. The method of any of Examples 14-15, further comprising: receiving, by the first network node, a message from the user equipment to activate the time division multiplexing pattern at the first network node.

Example 17. A method for a handover in a communication network, comprising: receiving, by a second network node, a handover request from a first network node, the handover request including at least a request for a time division multiplexing pattern for a user equipment; configuring a condition at the second network node for activating the time division multiplexing pattern at the user equipment; and sending, by the second network node, a handover request acknowledgement to the first network node, wherein the handover request acknowledgement includes the condition.

Example 18. The method of Example 17, further comprising: receiving, by the second network node, a message from the user equipment to activate the time division multiplexing pattern at the second network node.

Example 19. The method of any of Examples 1-18, wherein the user equipment is configured with a plurality of panels.

Example 20. The method of any of Examples 1-19, wherein the first network node is a source cell and/or the second network node is a target cell.

Example 21. The method of any of Examples 1-20, wherein the user equipment, the first network node, and/or the second network node are operating in a frequency range 2 (FR2).

Example 22. An apparatus comprising means for performing the method of any of Examples 1-21.

Example 23. A non-transitory computer-readable storage medium comprising instructions stored thereon that, when executed by at least one processor, are configured to cause a computing system to perform the method of any of Examples 1-21.

Example 24. An apparatus comprising: at least one processor; and at least one memory including computer program code, the at least one memory and the computer program code configured to, with the at least one processor, cause the apparatus at least to perform the method of any of Examples 1-21.

Figure 8:
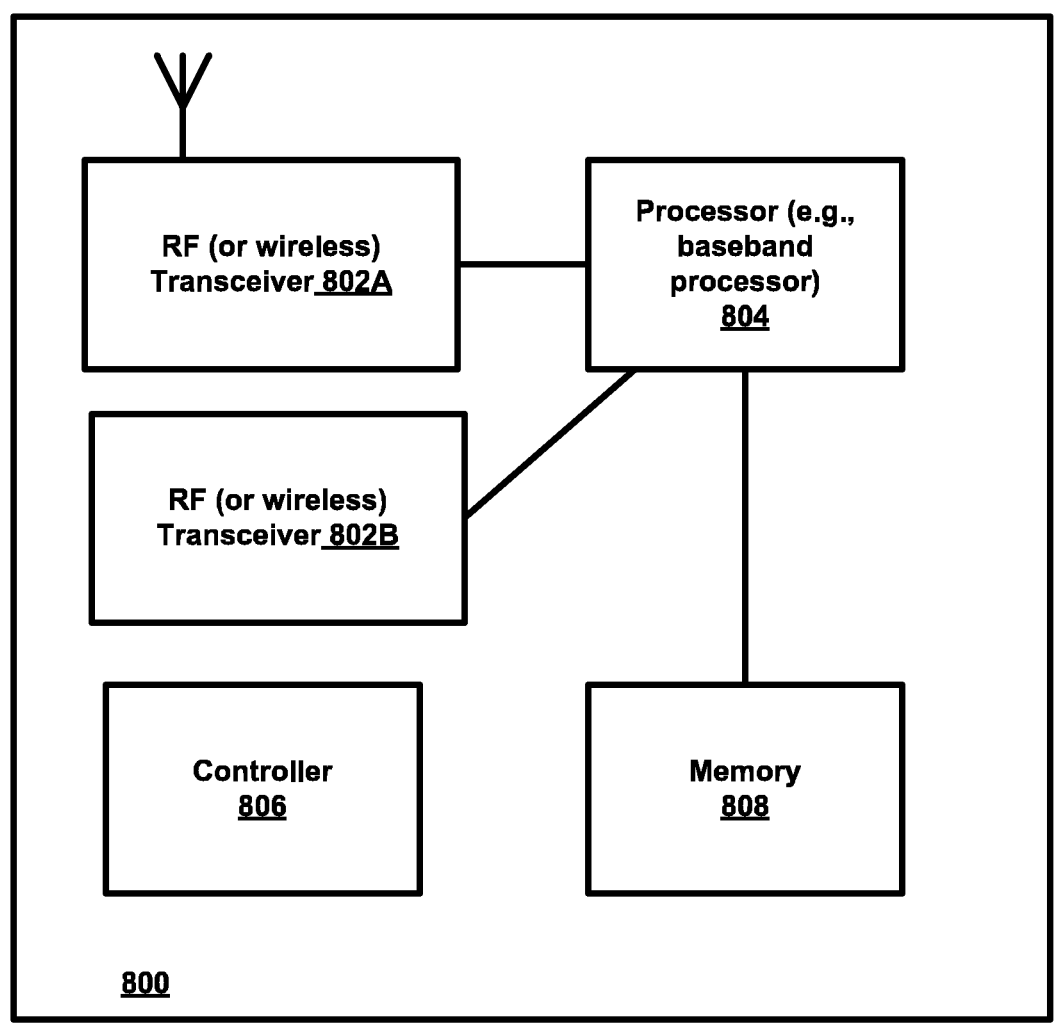
FIG. 8 is a block diagram of a node or wireless station (e.g., base station/access point or mobile station/user device/UE), according to an example implementation.

FIG. 8 is a block diagram of a wireless station (e.g., user equipment (UE)/user device or AP/gNB/MgNB/SgNB) 800 according to an example implementation. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/806 to execute instructions or software and control transmission and receptions of signals, and a memory 808 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller 806 (or processor 804) may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method for a handover in a communication network, comprising:
sending, by a user equipment, a measurement report to a first network node, the measurement report including at least a request for a time division multiplexing pattern; and
receiving, by the user equipment, a radio resource control configuration from the first network node, the radio resource control configuration including at least the time division multiplexing pattern,
wherein the condition includes an occurrence of a pre-configured time instance as defined in:
an absolute frame number,
relative to the time instant of receiving the handover command,
relative to sending a random access preamble, or
any combination thereof.

2. The method of claim 1, wherein the radio resource control configuration further includes at least a condition for activating the time division multiplexing pattern at the user equipment.

3. The method of claim 1, further comprising:
activating, by the user equipment, the time division multiplexing pattern in response to determining that the condition is satisfied at the user equipment.

4. The method of claim 1, further comprising:
sending a message to the first network node and/or a second network node prior to the activating of the time division multiplexing pattern at the first network node and/or the second network node, the message informing the first network node and/or the second network node to activate the time division multiplexing at the first network node and/or the second network node, respectively.

5. The method of claim 1, wherein a message is sent to the first network node via a medium access control (MAC) control element (CE).

6. The method of claim 1, wherein a message is sent to the second network node via a message 1 of a four-step random access procedure or a message A of a two-step random access procedure in response to the condition being satisfied prior to sending of a radio resource control configuration complete message.

7. The method of claim 1, wherein a message is sent to the second network node via a medium access control (MAC)

control element (CE) in response to the condition being satisfied after sending of a radio resource control configuration complete message.

8. The method of claim 1, wherein a message is sent to the first network node, and the message is forwarded from the first network node to the second network node via an Xn interface between the first network node and the second network node.

9. The method of claim 1, wherein a message is sent to the second network node, and the message is forwarded from the second network node to the first network node via an Xn interface between the second network node and the first network node.

10. The method of claim 1, wherein the request includes:

a binary flag, a flag indicating whether a time division multiplexing pattern can be used at the user equipment, or a probability of requiring a time division multiplexing pattern at the user equipment.

11. The method of claim 1, wherein the condition is based on whether the time division multiplexing pattern is needed.

12. The method of any of claim 1, wherein the time division multiplexing pattern is linked to one or more search spaces and/or control resource sets.

13. A user equipment, comprising:

at least one processor; and at least one memory storing instructions that, when executed by the at least one processor, cause the user equipment at least to perform:

sending a measurement report to a first network node, the measurement report including at least a request for a time division multiplexing pattern; and receiving a radio resource control configuration from the first network node, the radio resource control configuration including at least the time division multiplexing pattern, wherein the condition includes an occurrence of a preconfigured time instance as defined in:

an absolute frame number, relative to the time instant of receiving the handover command, relative to sending a random access preamble, or any combination thereof.

\* \* \* \* \*